April 5, 1938. M. L. OPPENHEIMER 2,113,382
FRONT END SUSPENSION FOR VEHICLES
Filed Feb. 25, 1937

Inventor:
Mayer Leonard Oppenheimer
By Chapman Ferguson
Attorney.

Patented Apr. 5, 1938

2,113,382

UNITED STATES PATENT OFFICE 2,113,382

FRONT END SUSPENSION FOR VEHICLES

Mayer Leonard Oppenheimer, Baltimore, Md.

Application February 25, 1937, Serial No. 127,604

2 Claims. (Cl. 267—20)

This invention relates to a new and useful improvement in front end suspension for vehicles, and is especially adapted for the suspension of the front wheels of automobiles.

The object of the invention is to prevent road shocks being transmitted to the body of the vehicle, and thereby provide a more comfortable riding effect.

The invention consists of the novel construction and arrangement of the parts and combination of parts hereinafter more fully set forth in the following specification and pointed out in detail in the appended claims.

In the accompanying drawing,—

Figure 1:
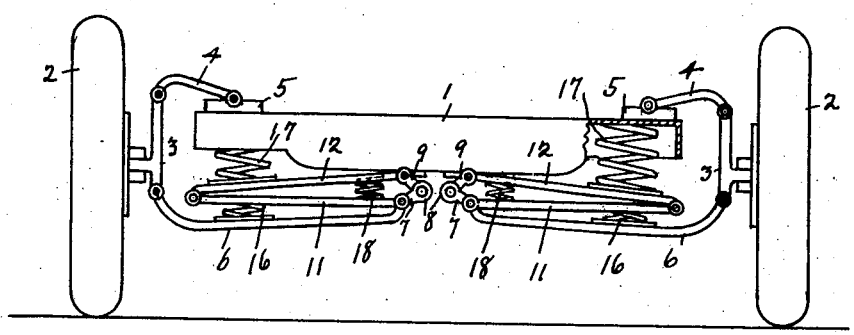
Figure 1 is an elevation of the front end of the chassis of an automobile showing my invention applied thereto.
Figure 2:
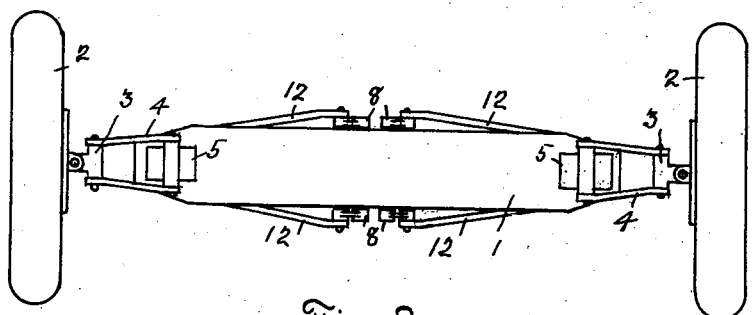
Figure 2 is a top plan view of Figure 1.
Figure 3:
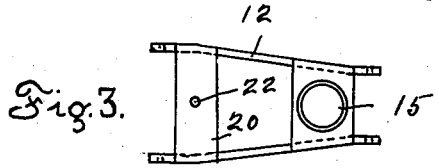
Figures 3, 4 and 5 are plan views of the three control arms, each having a spring seat thereon.
Figure 4:
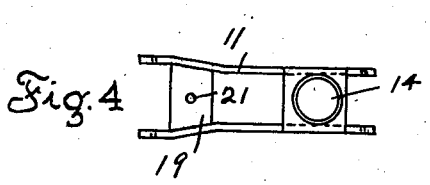
Figure 5:
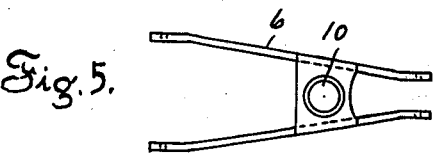
Figure 6:
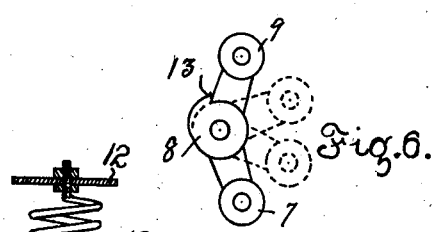
Figure 6 is an enlarged detail view of one of the toggle joints.
Figure 7:
Figure 7 is an enlarged detail view of one of the tension springs.

There are two sets of control arms and springs, one for each of the front wheels, and as each set is identical in construction and operation, the description of one set will be sufficient for the purpose of this specification.

Referring to the accompanying drawing, forming part of this specification, and in which like reference numerals designate like parts throughout the several views thereof, 1 designates the chassis of an automobile and 2 the front wheels thereof. The wheels 2 are mounted on the uprights 3 which in turn is pivotally connected to one end of the arms 4. The opposite end of the arm 4 is connected to the shock-absorber 5 on the chassis 1. The lower control arm 6 is pivotally connected at one end to the lower end of the upright 3 and its opposite end pivoted to an arm 7 of the toggle joint 8, the other arm 9 of the toggle joint 8 is secured to the under side of the chassis 1. The said control arm 6 is provided with the spring seat 10. The control arms 11 and 12 are pivotally connected at their outer end and the inner end of the arm 11 is pivotally connected to the arm 7 of the toggle joint 8 and the inner end of the arm 12 is connected to the arm 9 of said toggle joint 8. The arm 7 is provided with a shoulder 13 to limit the expanding movement of the arms 7 and 9. The control arms 11 and 12 are provided with spring seats 14 and 15, respectively. Between the control arms 6 and 11 is a compression spring 16 resting in the seats 10 and 14 and normally exerting its pressure to keep said arms apart, and between the arm 12 and the chassis 1 is another compression spring 17 resting in the seat 15 and normally exerting its pressure against said control arm 12. Between the inner ends of the control arms 11 and 12 is a tension spring 18 resting on the seats 19 and 20 and having its ends threaded and projecting through the apertures 21 and 22 and having a nut on each end, which keeps the inner ends of the control arms 11 and 12 in their proper relative position.

When the wheel 2 strikes a rise in the road it compresses the springs 16 and 17 and at the same time the arm 6 pulls on the arm 7 of the toggle joint 8 forcing the arms 7 and 9 apart against the action of the tension spring 18, and should the wheel drop into a depression in the road the chassis will remain level on account of the action of the springs 16 and 17.

Having thus described my invention, what I claim is:

1. A front end suspension for vehicles comprising two units each comprising an upright to which the front wheels are pivoted, an arm connecting the upper end of said upright with the frame of the vehicle, a toggle joint having one arm thereof pivoted to the vehicle frame, an arm pivoted at one end to the lower end of said upright and its opposite end pivoted to one arm of the toggle joint, two control arms having their outer ends pivoted together and the upper one of which is pivoted at its inner end to one arm of the toggle joint and the other pivoted to the other arm of said toggle joint, a compression spring between the frame and the outer end of the upper control arm, a compression spring between the outer end of the central control arm and the lower control arm, and a tension spring between the inner ends of the upper and central control arms.

2. A front end suspension for vehicles, comprising two units each having an upright to which the front wheels are pivoted, a shock absorber secured to the upper surface of the vehicle frame, an arm connecting the upper end of the upright with the shock absorber, a toggle joint having one arm pivoted to the vehicle frame, a lower control arm having one end pivoted to the lower end of said upright and its other end pivoted to one arm of said toggle joint, an upper control arm having one end pivoted to one arm of said toggle joint, a central control arm having one end pivoted to one arm of said toggle joint and its opposite end pivoted to the inner end of the central control arm, a compression spring between the frame and the outer end of the upper control arm, a compression spring between the outer ends of the central control arm and the lower control arm, and a tension spring between the inner ends of the upper and central control arms.

MAYER LEONARD OPPENHEIMER.